(12) United States Patent
Jeon

(10) Patent No.: US 10,388,246 B2
(45) Date of Patent: Aug. 20, 2019

(54) ELECTRONIC DEVICE AND CONTROL METHOD THEREOF

(71) Applicant: Samsung Electronics Co., Ltd., Suwon-si, Gyeonggi-do (KR)

(72) Inventor: Jin-Young Jeon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/802,926

(22) Filed: Nov. 3, 2017

(65) Prior Publication Data

US 2018/0130441 A1 May 10, 2018

(30) Foreign Application Priority Data

Nov. 4, 2016 (KR) .................. 10-2016-0147021

(51) Int. Cl.
*G09G 5/00* (2006.01)
*G06F 1/3234* (2019.01)
(Continued)

(52) U.S. Cl.
CPC .......... *G09G 5/001* (2013.01); *G06F 1/1613* (2013.01); *G06F 1/3265* (2013.01); *G09G 3/20* (2013.01); *G09G 5/006* (2013.01); *G09G 5/008* (2013.01); *G09G 5/363* (2013.01); *G09G 2310/0278* (2013.01); *G09G 2310/08* (2013.01); *G09G 2330/022* (2013.01); *G09G 2360/127* (2013.01); *G09G 2370/12* (2013.01); *G09G 2370/16* (2013.01)

(58) Field of Classification Search
CPC .......... G09G 5/001; G09G 3/20; G09G 5/006; G09G 5/008; G09G 5/363; G09G 2310/0278; G09G 2310/08; G09G 2330/022; G09G 2360/127; G09G 2370/12; G09G 2370/16; G06F 1/1613
See application file for complete search history.

(56) References Cited

U.S. PATENT DOCUMENTS

2004/0263461 A1* 12/2004 Park ................. G09G 3/3677
345/98
2007/0143713 A1* 6/2007 Hosoki ............... G06F 9/485
715/859

(Continued)

FOREIGN PATENT DOCUMENTS

JP 2009-037028 A 2/2009
KR 10-2015-0000807 A 1/2015

*Primary Examiner* — Stephen G Sherman
(74) *Attorney, Agent, or Firm* — Jefferson IP Law, LLP

(57) ABSTRACT

An electronic device is provided. The electronic device includes a display, at least one processor, a memory that is electrically connected to the at least one processor, and a display driver integrated circuit that is electrically connected to the at least one processor. The at least one processor is configured to receive a synchronization signal request corresponding to a first process initiated by the at least one processor from the at least one processor, determine whether the first process is for displaying an image in response to the synchronization signal request, and control an activation state of the display driver integrated circuit for displaying the image based on a determination result. The memory is configured to store instructions for the at least one processor to initiate and run the first process.

21 Claims, 9 Drawing Sheets

(51) Int. Cl.
*G09G 5/36* (2006.01)
*G06F 1/16* (2006.01)
*G09G 3/20* (2006.01)

(56) References Cited

U.S. PATENT DOCUMENTS

| | | |
|---|---|---|
| 2013/0155036 A1 | 6/2013 | Kim et al. |
| 2014/0347340 A1* | 11/2014 | Tse .......................... G09G 5/18 |
| | | 345/212 |
| 2015/0325213 A1 | 11/2015 | Lee |
| 2016/0155421 A1 | 6/2016 | Han et al. |
| 2016/0299188 A1 | 10/2016 | Woo et al. |
| 2016/0381255 A1* | 12/2016 | Huang .................. G06F 3/0488 |
| | | 348/500 |

* cited by examiner

ELECTRONIC DEVICE AND CONTROL METHOD THEREOF

CROSS-REFERENCE TO RELATED APPLICATION(S)

This application claims the benefit under 35 U.S.C. § 119(a) of a Korean patent application filed on Nov. 4, 2016 in the Korean Intellectual Property Office and assigned Serial number 10-2016-0147021, the entire disclosure of which is hereby incorporated by reference.

TECHNICAL FIELD

The present disclosure relates to an electronic device that displays an image, and a control method thereof.

BACKGROUND

Recently, technology has been disclosed that enables electronic devices, such as smartphones or wearable devices, to run at least one application (for example, a gallery application), to generate an image within the run application, and to output the generated image through a display.

In image output technology, in order to smoothly display a plurality of images generated in an application through a display, modules (for example, a gate driver in a display driver integrated circuit) associated with image generation and output in an electronic device may generate an image and may output the generated image in accordance with the refresh cycle of the display.

The above information is presented as background information only to assist with an understanding of the present disclosure. No determination has been made, and no assertion is made, as to whether any of the above might be applicable as prior art with regard to the present disclosure.

SUMMARY

Electronic devices of the related art, particularly wearable devices, need to output a plurality of images through a display using limited power (for example, a low-capacity battery), and to generate and output an image in accordance with a synchronization signal corresponding to a refresh cycle, the display constantly being supplied with power (power-on) in order to output an image, without any procedure for determining whether a process is for generating an image or for outputting an image. Accordingly, unnecessary power may be consumed.

Aspects of the present disclosure are to address at least the above-mentioned problems and/or disadvantages and to provide at least the advantages described below. Accordingly, an aspect of the present disclosure is to provide a technique for controlling the power applied to a display according to the importance of a process by determining the type of a process corresponding to a synchronization signal request made from at least one application.

In accordance with an aspect of the present disclosure, an electronic device is provided. The electronic device includes a display, at least one processor, a memory electrically connected to the at least one processor, and a display driver integrated circuit electrically connected to the at least one processor, wherein the at least one processor is configured to receive a synchronization signal request corresponding to a first process initiated by the at least one processor from the at least one processor, determine whether the first process is for displaying an image in response to the synchronization signal request, and control an activation state of the display driver integrated circuit for displaying the image based on a determination result, wherein the memory is configured to store instructions for the at least one processor to initiate and run the first process.

In accordance with another aspect of the present disclosure, a control method of an electronic device is provided. The control method includes receiving, from at least one processor, a synchronization signal request corresponding to a first process initiated by the at least one processor, determining whether the first process is for displaying an image in response to the synchronization signal request, and controlling an activation state of a display driver integrated circuit for displaying the image based on a determination result.

An electronic device according to various embodiments of the present disclosure may control the amount of power applied to a display based on a result of distinguishing a process for generating an image from a process for outputting an image, thereby reducing the amount of power consumed by the electronic device and enabling a user to use the electronic device for a longer time.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
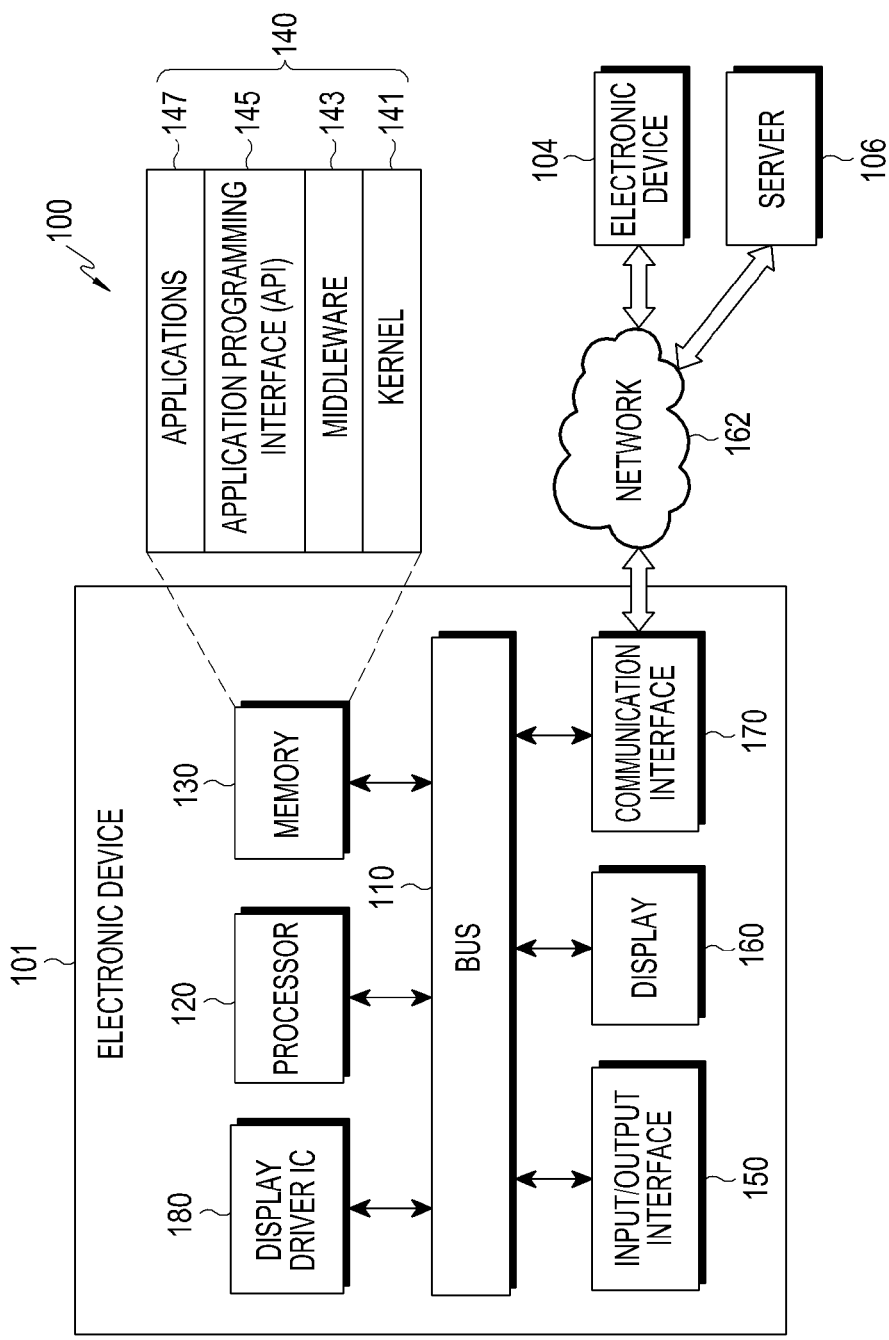
FIG. 1 illustrates a network environment including a plurality of electronic devices according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the other element (second element) or connected to the other element (second element) through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to an embodiment of the present disclosure is not limited to the above described devices. In the present disclosure, the term "user" may indicate a person using an electronic device or a device (e.g., an artificial intelligence electronic device) using an electronic device.

FIG. 1 illustrates an electronic device 101 in a network environment 100 according to various embodiments of the present disclosure.

Referring to FIG. 1, the electronic device 101 may include a bus 110, a processor 120 (e.g., at least one processor), a memory 130, an input/output interface 150, a display 160, a communication interface 170, and a display driver integrated circuit (DDI) 180. In some embodiments, at least one of the components may be omitted, or an additional component may be further included in the electronic device 101. The bus 110 may include a circuit that connects the components 110 to 170 to each other and delivers communications (for example, control messages or data) between the components. The processor 120 may include one or more of a central processing unit, an AP, and a communication processor (CP). The processor 120 may control, for example, at least one different component of the electronic device 101, and/or may perform an operation relating to communication or data processing.

According to an embodiment, the processor 120 may generate a plurality of pieces of screen data displayed through the display 160. Also, the processor 120 may control the communication interface 170 to receive the plurality of pieces of screen data from another device (for example, an electronic device 104 or a server 106). When the plurality of pieces of screen data is generated or is received from another device, the processor 120 may forward the plurality of pieces of screen data to the DDI 180.

The memory 130 may include volatile and/or nonvolatile memory. The memory 130 may store, for example, a command or data related to at least one different component of the electronic device 101. According to an embodiment, the memory 130 may store software and/or a program 140. The program 140 may include, for example, a kernel 141, middleware 143, an application programming interface (API) 145, and/or an application program (or "application") 147. At least part of the kernel 141, the middleware 143, and the API 145 may be designated as an operating system. The kernel 141 may control or manage system resources (for example, the bus 110, the processor 120, the memory 130, the DDI 180, or the like) used to perform an operation or function implemented in other programs (for example, the middleware 143, the API 145, or the application program 147). Further, the kernel 141 may provide an interface that allows the middleware 143, the API 145, or the application program 147 to access individual components of the electronic device 101 to thereby control or manage system resources.

The middleware 143 may serve as a relay so that, for example, the API 145 or the application program 147 communicates with the kernel 141 to exchange data. Further, the middleware 143 may process one or more requests for operations received from the application program 147 according to the priority thereof. For example, the middleware 143 may assign at least one application program 147 a priority for using a system resource (for example, the bus 110, the processor 120, the DDI 180, the memory 130, or the like) of the electronic device 101, and may process the one or more requests for operations based thereon. The API 145 is an interface for the application program 147 to control a function provided from the kernel 141 or the middleware 143, and may include, for example, at least one interface or function (for example, a command) for file control, window control, image processing, or text control. The input/output interface 150 may deliver a command or data, which is input from, for example, a user or a different external device, to a different component(s) of the electronic device 101, or may output a command or data, which is received from a different component(s) of the electronic device 101, to the user or to the different external device.

The display 160 may include, for example, a liquid crystal display (LCD), a light-emitting diode (LED) display, an organic LED (OLED) display, a micro-electro-mechanical systems (MEMS) display, and an electronic paper display. The display 160 may display, for example, various types of content (for example, a text, an image, a video, an icon, a symbol, and/or the like) for the user. The display 160 may include a touch screen and may receive touch, gesture, proximity, or hovering input using, for example, an electronic pen or a body part of a user. The communication interface 170 may establish communication, for example, between the electronic device 101 and an external device (for example, an external electronic device 104, or the server 106).

The display 160 may display various types of information (for example, multimedia data, text data, or the like) for a user. The display 160 may display screen data under the control of the DDI 180.

The DDI 180 may be configured as at least one processor and may take a software module form or a hardware module form.

For example, the DDI 180 may be included in the display 160. In another example, the DDI 180 may be integrated with the display 160.

In an example, the DDI 180 may include at least one processor, and the at least one processor may perform at least some of the following operations of the DDI 180. The DDI 180 may process at least some of information acquired from other components (for example, the processor 120, the memory 130, the input/output interface 150, the communication interface 170, or the like) and may provide processed information for a user according to various methods. For example, the DDI 180 may control at least some functions of the electronic device 101, either using the processor 120 or independently of the processor 120, so that the electronic device 101 interworks with another electronic device (for example, the electronic device 104 or the server 106).

According to various embodiments, the DDI 180 may control the display of content displayed through the display 160. For example, the DDI 180 may perform control so that the display 160 displays a lock screen.

According to an embodiment, the DDI 180 may receive screen data from the processor 120 or may receive screen data from another electronic device (for example, the electronic device 104 or the server 106) through the communication interface 170.

The DDI 180 may control the display of screen data. For example, when the screen data is a lock screen, the DDI 180 may control the display 160 so that the lock screen is displayed after the lapse of time.

Further information on the processor 120 and the DDI 180 are provided through FIGS. 2 to 9, to be described later.

For example, the communication interface 170 may be connected to a network 162 via wireless communication 164 or wired communication to communicate with an external device (for example, the second external electronic device 104 or the server 106).

The wireless communication may include cellular communication using, for example, at least one of long-term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). In an embodiment, the wireless communication may include, for example, at least one of Wi-Fi, Bluetooth, Bluetooth low energy (BLE), ZigBee, near field communication (NFC), magnetic secure transmission, radio frequency (RF), and a body area network (BAN). In an embodiment, the wireless communication may include a global navigation satellite system (GNSS). The GNSS may be, for example, a GPS, a global navigation satellite system (GLONASS), a BeiDou navigation satellite system (hereinafter, "BeiDou"), or Galileo, which is the European global satellite-based navigation system. In the present document, "GPS" may be interchangeably used with "GNSS" hereinafter. The wired communication may include, for example, at least one of universal serial bus (USB), high definition multimedia interface (HDMI), recommended standard 232 (RS-232), power line communication, and plain old telephone service (POTS). The network 162 may include a telecommunications network, which may be, for example, at least one of a computer network (for example, a local area network (LAN) or wide area network (WAN)), the Internet, and a telephone network.

The external electronic device 104 may each be a device of a type that is the same as, or different from, that of the electronic device 101. According to various embodiments, all or part of the operations performed in the electronic device 101 may be performed in another electronic device or a plurality of electronic devices (for example, the electronic device 104 or the server 106). According to an embodiment, when the electronic device 101 needs to perform a function or service automatically or upon request, the electronic device 101 may request another electronic device (for example, the electronic device 104, or the server 106) to perform at least some functions related to the function or service, instead of, or in addition to, autonomously performing the function or service. The other electronic device (for example, the electronic device 104, or the server 106) may perform the requested functions or additional function and may transmit the result of execution thereof to the electronic device 101. The electronic device 101 may provide the requested function or service using the same received result or after additionally processing the result. To this end, cloud computing, distributed computing, or client-server computing technologies may be used.

Figure 2:
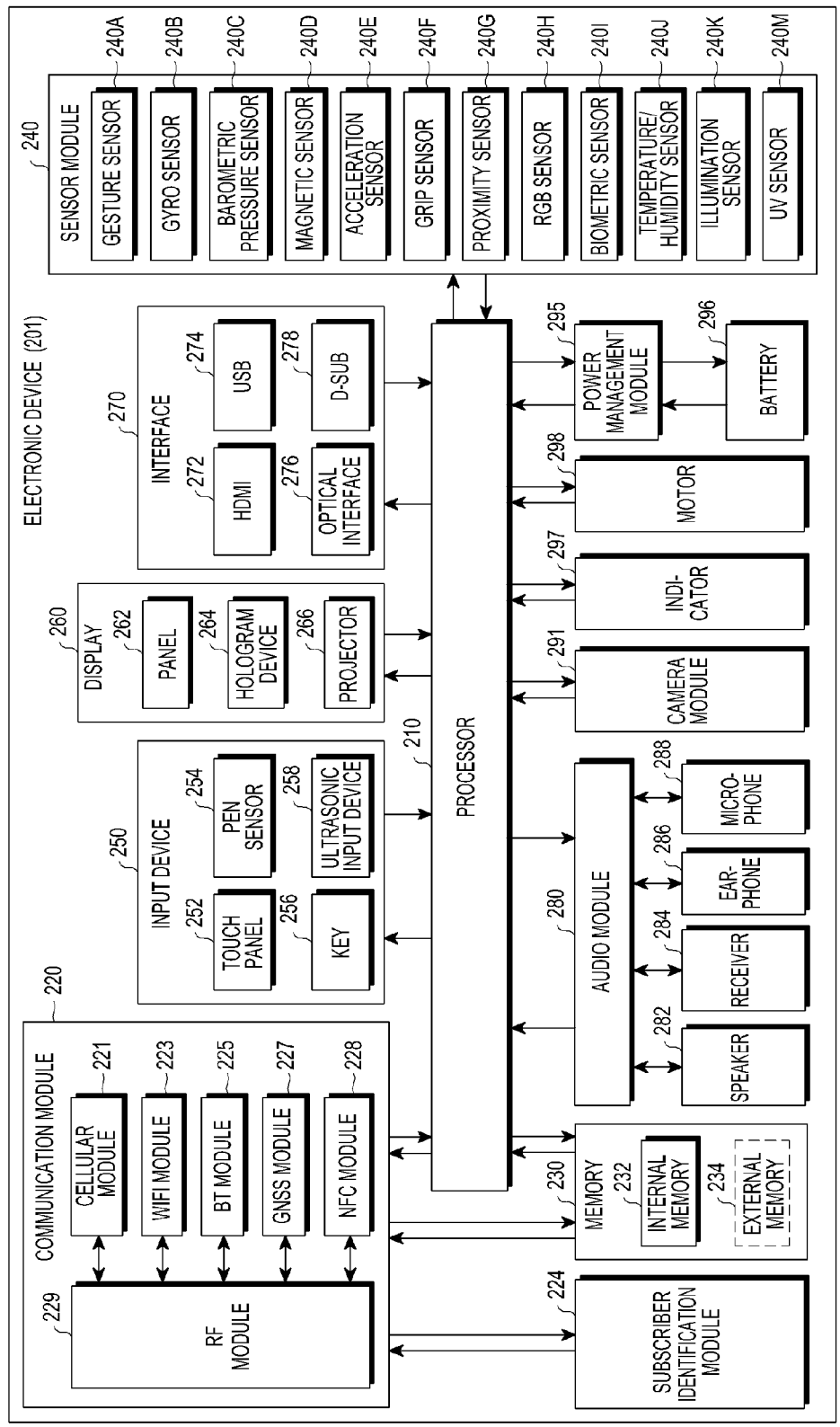
FIG. 2 is a block diagram of an electronic device according to various embodiments of the present disclosure.

FIG. 2 is a block diagram of an electronic device 201 according to various embodiments of the present disclosure.

Referring to FIG. 2, the electronic device 201 may include, for example, all or part of the electronic device 101 illustrated in FIG. 1. The electronic device 201 may include one or more processors (for example, application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processors 210 may run, for example, an operating system or an application program to control a plurality of hardware or software components that are connected to the processors 210, and may perform various kinds of data processing and operations. The processors 210 may be configured, for example, as a system on chip (SoC). According to an embodiment, the processors 210 may further include a graphic processing unit (GPU) and/or an image signal processor (ISP). The processors 210 may include at least part (for example, a cellular module 221) of the components illustrated in FIG. 2. The processors 210 may load a command or data received from at least one of other components (for example, a nonvolatile memory) into a volatile memory to process the command or data, and may store the resultant data in the nonvolatile memory.

The communication module 220 may have a configuration that is the same as, or similar to, that of the communication interface of FIG. 1 (for example, the communication interface 170). The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text messaging service, or an Internet service through a communication network. According to an embodiment, the cellular module 221 may perform identification and authentication of the electronic device 201 in a communication network using the SIM (for example, a SIM card) 224. According to an embodiment, the cellular module 221 may perform at least part of the functions provided by the processors 210. According to an embodiment, the cellular module 221 may include a communication processor (CP). According to an embodiment, at least some (for example, two or more) of the cellular module 221, the Wi-Fi module 223, the Bluetooth module 225, the GNSS module 227, and the NFC module 228 may be included in one integrated chip (IC) or IC package. The RF module 229 may transmit and receive, for example, a communication signal (for example, an RF signal). The RF module 229 may include, for example, a transceiver, a power amplifier (amp) module (PAM), a frequency filter, a low noise amplifier (LNA), an antenna, or the like. According to another embodiment, at least one of the cellular module 221, the Wi-Fi module 223, the Bluetooth module 225, the GNSS module 227, and the NFC module 228 may transmit and receive an RF signal through a separate RF module. The SIM 224 may include, for example, a card including an SIM or an embedded SIM and may include unique identification information (for example, an integrated circuit card identifier (ICCID)) or subscriber information (for example, an international mobile subscriber identity (IMSI)).

The memory 230 (for example, the memory 130 shown in FIG. 1) may include, for example, an internal memory 232 or an external memory 234. The internal memory 232 may include, for example, at least one of a volatile memory (for example, a dynamic random access memory (DRAM), an static RAM (SRAM), an synchronous DRAM (SDRAM), or the like) and a nonvolatile memory (for example, an one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD)). The external memory 234 may include a flash drive, for example, a compact flash (CF), a secure digital (SD), a micro-SD, a mini-SD, an extreme digital (xD), a multi-media card (MMC), a memory stick, or the like. The external memory 234 may be functionally or physically connected to the electronic device 201 through various interfaces.

The sensor module 240 may measure, for example, physical quantities, or may detect the state of operation of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In an embodiment, the electronic device 201 may further include a processor configured, as part of the processors 210 or separately from the processors 210, to control the sensor module 240, thereby controlling the sensor module 240 while the processors 210 are in a sleep state.

The input device 250 may include, for example, a touch panel 252, a (digital) pen sensor 254, a key 256, or an ultrasonic input device 258. The touch panel 252 may be, for example, at least one of an electrostatic type, a pressure-sensitive type, an infrared (IR) type, and an ultrasonic type. Further, the touch panel 252 may further include a control circuit. The touch panel 252 may further include a tactile layer to provide a user with a tactile response. The (digital) pen sensor 254 may, for example, be part of the touch panel or may include a separate recognition sheet. The key 256 may include, for example, a physical button, an optical key, or a keypad. The ultrasonic input device 258 may detect ultrasonic waves generated in an input tool through a microphone (for example, a microphone 288) and may identify data corresponding to the detected ultrasonic waves.

The display 260 (for example, the display 160 shown in FIG. 1) may include a panel 262, a hologram device 264, a projector 266, and/or a control circuit to control the panel 262, the hologram device 264, or the projector 266. The panel 262 may be configured, for example, to be flexible, transparent, or wearable. The panel 262 may be formed with the touch panel 252 in one or more modules. According to an embodiment, the panel 262 may include a pressure sensor (or force sensor) to measure the strength of pressure of a user's touch. The pressure sensor may be formed with the touch panel 252 in a single body, or may be provided as one or more sensors separate from the touch panel 252. The hologram device 264 may display a three-dimensional image in the air using the interference of light. The projector 266 may project light onto a screen to display an image. The screen may be disposed, for example, inside or outside the electronic device 201. The interface 270 may include, for example, an HDMI 272, a USB 274, an optical interface 276, or a D-subminiature (D-sub) interface 278. The interface 270 may be included, for example, in the communication interface 170 illustrated in FIG. 1. Additionally or alternatively, the interface 270 may include, for example, a mobile high-definition link (MHL) interface, an SD card/MMC interface, or an infrared data association (IrDA) interface.

The audio module 280 may bidirectionally convert, for example, a sound and an electrical signal. At least some components of the audio module 280 may be included, for example, in the input/output interface 150 illustrated in FIG. 1. The audio module 280 may process sound information input or output, for example, through a speaker 282, a receiver 284, earphones 286, or the microphone 288. The camera module 291 is a device that takes, for example, a still image and a video. According to an embodiment, the camera module 291 may include one or more image sensors (for example, a front sensor or a rear sensor), a lens, an image signal processor (ISP), or a flash (for example, an LED, a Xenon lamp, or the like). The power management module 295 may manage, for example, the power of the electronic device 201. According to an embodiment, the power management module 295 may include a power management integrated circuit (PMIC), a charger integrated circuit (IC), or a battery or fuel gauge. The PMIC may have wired and/or wireless charging methods. The wireless charging methods may include, for example, a magnetic-resonance method, a magnetic-induction method, or an electromagnetic-wave method, and may further include an additional circuit for wireless charging, such as a coil loop, a resonance circuit, or a rectifier. The battery gauge may measure, for example, the remaining battery charge, the charging voltage, the current, or the temperature of the battery 296. The battery 296 may include, for example, a rechargeable battery and/or a solar battery.

The indicator 297 may display the specific state of the electronic device 201 or a component thereof (for example, the processors 210), which may be, for example, a booting state, a message state, or a charging state. The motor 298 may convert an electrical signal into mechanical vibrations and may generate vibrations or a haptic effect. The electronic device 201 may include a mobile TV support device (for example, a GPU) that is capable of processing media data in accordance with, for example, digital multimedia broadcasting (DMB), digital video broadcasting (DVB), or mediaFlo™ standards. Each element mentioned in the present document may include one or more components, and may be designated by different terms depending on the type of the electronic device. In various embodiments, an electronic device (for example, the electronic device 201) may be configured such that some elements are omitted, additional elements are further included, or some of the elements are combined into one entity, but may perform the same functions as those of the corresponding elements before the combination thereof.

Figure 3:
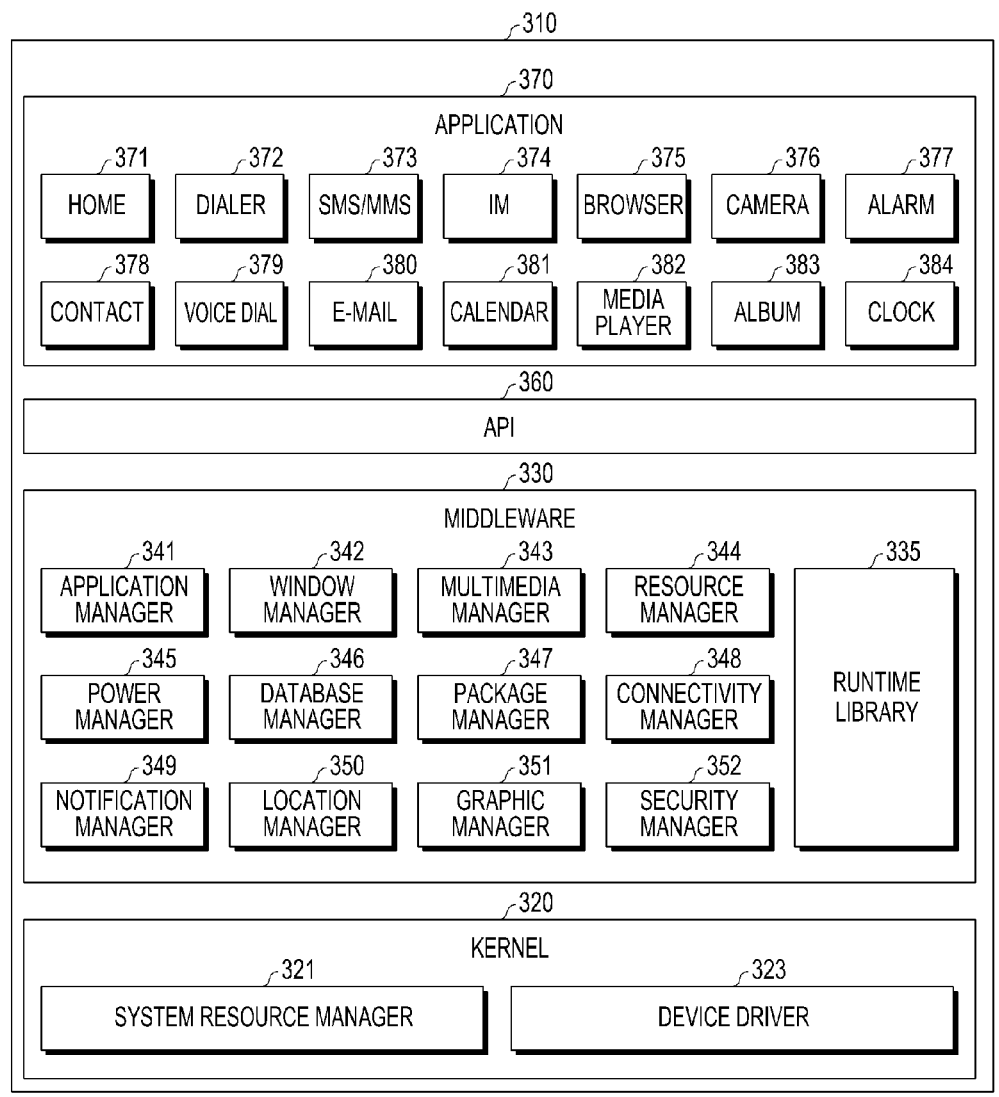
FIG. 3 is a block diagram of a program module according to various embodiments of the present disclosure.

FIG. 3 is a block diagram of a program module according to various embodiments of the present disclosure.

Referring to FIG. 3, according to an embodiment, the program module 310 (for example, the program 140 shown in FIG. 1) may include an operating system that controls resources related to an electronic device (for example, the electronic device 101 shown in FIG. 1) and/or various applications (for example, the application program 147 shown in FIG. 1) that run on the operating system. The operating system may include, for example, Android™, iOS™, Windows™, Symbian™, Tizen™, Bada™, or the like. Referring to FIG. 3, the program module 310 may include a kernel 320 (for example, the kernel 141 shown in FIG. 1), middleware 330 (for example, the middleware 143 shown in FIG. 1), an API 360 (for example, the API 145), and/or an application 370 (for example, the application program 147 shown in FIG. 1). At least part of the program module 310 may be preloaded onto the electronic device or may be downloaded from an external electronic device (for example, the electronic device 104, the server 106, or the like shown in FIG. 1).

The kernel 320 may include, for example, a system resource manager 321 and/or a device driver 323. The system resource manager 321 may perform control, allocation, or recovery of system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, functions commonly needed for applications 370, or may provide an application 370 with various functions through the API 360 so that the application 370 may use the limited systems resources in the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier to add a new function through a programming language while the application 370 is running. The runtime library 335 may perform input/output management, memory management, or arithmetic function processing. The application manager 341 may manage, for example, the life cycle of the application 370. The window manager 342 may manage graphic user interface (GUI) resources used for a screen. The multimedia manager 343 may identify formats that are necessary to play media files, and may encode or decode a media file using a codec suitable for a corresponding format. The resource manager 344 may manage source code or memory space for the application 370. The power manager 345 may manage battery capacity or the supply of power, and may provide information on power necessary for the operation of the electronic device. According to an embodiment, the power manager 345 may interwork with a basic input/output system (BIOS). The database manager 346 may generate, retrieve, or change a database to be used for, for example, the application 370. The package manager 347 may install or update an application distributed in the form of a package file.

The connectivity manager 348 may manage, for example, wireless connectivity. The notification manager 349 may provide a user with an event, for example, an incoming message, an appointment, and a proximity notification. The location manager 350 may manage, for example, information about the location of the electronic device. The graphic manager 351 may manage, for example, a graphic effect to be provided for the user or a user interface related to the graphic effect. The security manager 352 may provide, for example, system security or user authentication. According to an embodiment, the middleware 330 may include a telephony manager to manage a voice or video call function of the electronic device or a middleware module that is capable of forming combinations of functions of the foregoing elements. According to an embodiment, the middleware 330 may provide a specialized module for each operating system. The middleware 330 may dynamically delete some of the existing elements or add new elements. The API 360 is, for example, a set of API programming functions, and may be provided with a different configuration depending on the operating system. For example, one API set for each platform may be provided in Android™ or iOS™, while two or more API sets for each platform may be provided in Tizen™.

The application 370 may include, for example, home 371, a dialer 372, an short message service (SMS)/multimedia messaging service (MMS) 373, an instant messaging (IM) 374, a browser 375, a camera 376, an alarm 377, contacts 378, a voice dialer 379, an email 380, a calendar 381, a media player 382, an album 383, a watch 384, a health care application (for example, for measuring exercising or blood sugar), or an application providing environmental data (for example, atmospheric pressure, humidity, or temperature data). According to an embodiment, the application 370 may include an information exchange application that is capable of supporting information exchange between the electronic device and an external electronic device. The information exchange application may include, for example, a notification relay application for relaying specific information to the external electronic device or a device management application for managing the external electronic device. For example, the notification relay application may relay notification information, which is generated in another application of the electronic device, to the external electronic device, or may receive notification information from the external electronic device and provide the notification information to the user. The device management application may install, delete, or update, for example, a function (for example, a function of turning on/turning off the external electronic device itself (or some components) or adjusting the brightness (or resolution) of a display) of an external electronic device communicating with the electronic device or an application running in the external electronic device. According to an embodiment, the application 370 may include an application (for example, a health care application of a mobile medical device) assigned according to the attributes of the external electronic device. According to an embodiment, the application 370 may include an application received from the external electronic device. At least part of the program module 310 may be implemented (for example, run) by software, firmware, hardware (for example, the processor 210), or combinations of at least two or more thereof, and may include a module, a program, a routine, sets of instructions, or a process to perform one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an optical media (e.g., compact disc-ROM (CD-ROM), DVD), a magneto-optical media (e.g., a floptical disk), an inner memory, etc. The instruction may include a code made by a complier or a code that can be executed by an interpreter. The instruction may include a code made by a complier or a code that can be executed by an interpreter. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 4:
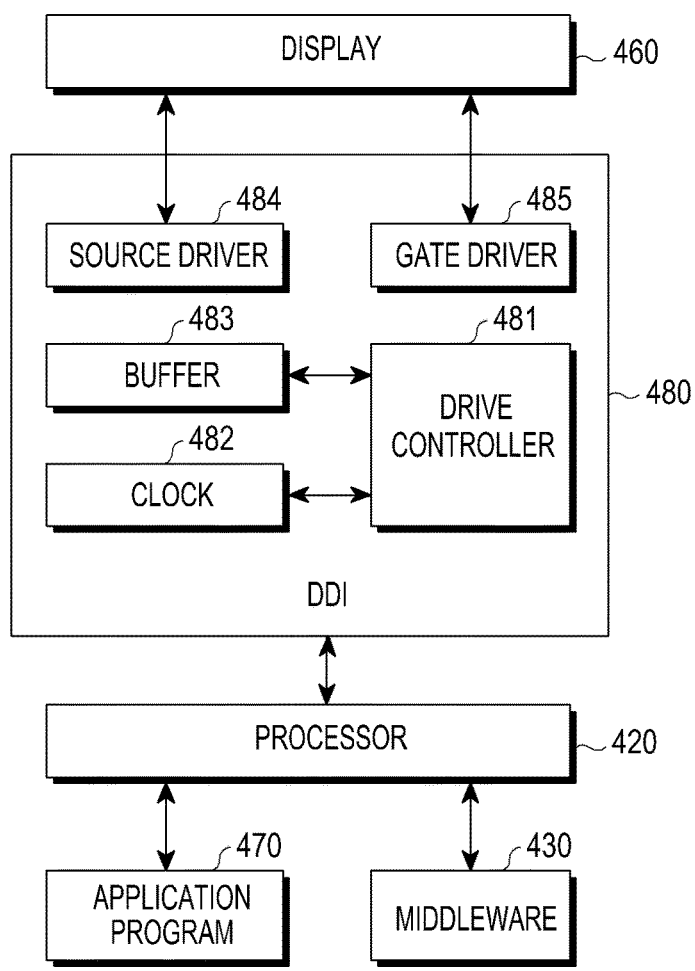
FIG. 4 illustrates an electronic device according to various embodiments of the present disclosure.

FIG. 4 illustrates an electronic device according to various embodiments of the present disclosure.

Referring to FIG. 4, according to various embodiments, the electronic device may include a display 460, a DDI 480, an application program 470, middleware 430, and/or a processor 420.

According to various embodiments, the display 460 may include a panel.

According to various embodiments, the processor 420 may control at least one program stored in the application program 470 or the middleware 430. For example, the processor 420 may initiate or run at least one process run in at least one program stored in the application program 470 or the middleware 430. For example, an operation of initiating a particular process may mean that at least one program initiates the particular process. For example, a process initiation operation may refer to an operation in which at least one program collects data (for example, a synchronization signal) for running a particular process prior to an operation of running the process.

According to various embodiments, after initiating the at least one process, the processor 420 may request a synchronization signal for running the at least one process from the DDI 480 before running the at least one process.

For example, the processor 420 may run a gallery application stored in the application program 470, may initiate an image change process within the run gallery application, and may request a synchronization signal for running the image change process from the DDI 480 before running the image change process.

Alternatively, the processor 420 may run a graphic manager (for example, the graphic manager 351) stored in the middleware 430, may initiate an image output process within the graphic manager 351, and may request a synchronization signal for running the image output process from the DDI 480 before running the image output process.

According to various embodiments, the DDI 480 may include a drive controller 481, a clock 482, a buffer 483, a source driver 484, and/or a gate driver 485.

According to various embodiments, the drive controller 481 may control the operation of the clock 482, the buffer 483, the source driver 484, and/or the gate driver 485. For example, the drive controller 481 may receive an image from the processor 420 and may store the received image in the buffer 483. Further, the drive controller 481 may output the image stored in the buffer 483 through the display 460. In addition, the drive controller 481 may output an image on the display 460 using the source driver 484.

According to various embodiments, the drive controller 481 may transmit a display synchronization signal to the processor 420 in response to a synchronization signal request received from the processor 420 when a first process of the processor 420 corresponding to the synchronization signal request is an image output process. A method of transmitting the display synchronization signal is as follows.

For example, the drive controller 481 may maintain the gate driver 485 in an active state. For example, the drive controller 481 may switch the gate driver 485 from an inactive state to an active state. Also, the drive controller 481 may switch the gate driver 485 from an active state to an inactive state.

For example, the drive controller 481 may apply a preset test signal to the display 460 using the gate driver 485. The drive controller 481 may receive an interruption synchronization signal as a response signal to the test signal applied through the gate driver 485 and may analyze the interruption synchronization signal to obtain a preset refresh cycle of the display 460. For example, the drive controller 481 may generate a display synchronization signal based on the refresh cycle. The drive controller 481 may transmit the display synchronization signal to the processor 420.

According to various embodiments, the drive controller 481 may transmit a clock synchronization signal to the processor 420, in response to a synchronization signal request received from the processor 420, when a first process of the processor 420 corresponding to the synchronization signal request is a process different from the image output process. A method of generating and transmitting the clock synchronization signal is as follows.

For example, the drive controller 481 may maintain the gate driver 485 in an inactive state and may generate a clock synchronization signal according to a preset period using the clock 482.

For example, the drive controller 481 may maintain the gate driver 485 in an inactive state according to a predetermined condition and may generate a clock synchronization signal according to a preset period. For example, the predetermined condition may be whether a timer, initiated based on a result of determining whether the first process is the image output process and initiated using a periodic signal generated from the clock 482, has expired. Alternatively, the predetermined condition may be whether a count initiated based on a result of determining whether the first process is the image output process has reached a threshold. For example, the count may be a result of adding numbers of synchronization signal requests whenever the drive controller 481 receives a synchronization signal request corresponding to a process different from the image output process among synchronization signal requests.

For example, with the gate driver 485 in an inactive state, the drive controller 481 may generate a clock synchronization signal using a periodic signal (for example, a clock signal) with a preset period generated from the clock 482. For example, the drive controller 481 may generate a second periodic signal having a period that is integer times the preset period of a first periodic signal generated from the clock 482 and may generate a clock synchronization signal with the same period as the refresh cycle of the display (for example, the display 160) using the generated second periodic signal.

For example, the drive controller 481 may transmit the clock synchronization signal to the processor 420.

An electronic device according to various embodiments of the present disclosure may include: a display; at least one processor; a memory that is electrically connected to the at least one processor; and a display driver IC (DDI) that is electrically connected to the at least one processor, receives a synchronization signal request corresponding to a first process initiated by the at least one processor from the at least one processor, determines whether the first process is for displaying an image in response to the synchronization signal request, and controls an activation state of the DDI for displaying the image based on a determination result, wherein the memory stores instructions for the at least one processor to initiate the first process and to run the first process.

According to various embodiments, the DDI may initiate a timer based on the determination result and may control the activation state of the DDI based on the determination result and a state of the timer.

According to various embodiments, the DDI may control the activation state of the DDI based on the determination result and whether the timer expires.

According to various embodiments, the DDI may initialize the timer when the first process is for displaying an image.

According to various embodiments, when it is determined that the first process is a process different from that for displaying an image, the DDI may determine whether the timer expires and may control the activation state of the DDI based on whether the timer expires.

According to various embodiments, the DDI may initiate a count based on the determination result and may control the activation state of the DDI based on the determination result and a state of the initiated count.

According to various embodiments, the DDI may control the activation state of the DDI based on the determination result and whether a value of the count reaches a threshold.

According to various embodiments, the DDI may initialize the initiated count when it is determined that the first process is for displaying an image.

According to various embodiments, when it is determined that the first process is a process different from that for displaying an image, the DDI may determine whether the count reaches a threshold, and may control the activation state of the DDI based on whether the count reaches the threshold.

According to various embodiments, the DDI may display at least one program list associated with the first process based on the determination result, may receive a request for termination of one or more programs among the at least one program through the list, and may control the activation state of the DDI in response to the request for termination.

According to various embodiments, the DDI may display synchronization signal request numbers corresponding to each of the at least one program, along with the at least one program list.

According to various embodiments, the DDI may include a gate driver that is electrically connected to the display and may control an activation state of the gate driver based on the determination result.

According to various embodiments, the DDI may maintain the gate driver in an active state when the first process is for displaying an image.

According to various embodiments, the DDI may acquire operating cycle information on the display using the gate driver, may generate a display synchronization signal based on the operating cycle information on the display, and may transmit the display synchronization signal to the at least one processor.

According to various embodiments, when it is determined that the first process is a process different from that for displaying an image, the DDI may maintain the gate driver in an inactive state.

According to various embodiments, the DDI may further include a clock, may generate a clock synchronization signal having a preset period using the clock, and may transmit the clock synchronization signal to the at least one processor.

An electronic device according to various embodiments of the present disclosure may include: a display; at least one processor; and a memory that is electrically connected to the at least one processor, wherein the memory stores instructions for the at least one processor to perform an operation of receiving a synchronization signal request corresponding to a first process, an operation of determining whether the first process is for displaying an image in response to the synchronization signal request, and an operation of controlling an activation state of a DDI for displaying the image based on a determination result.

Figure 5:
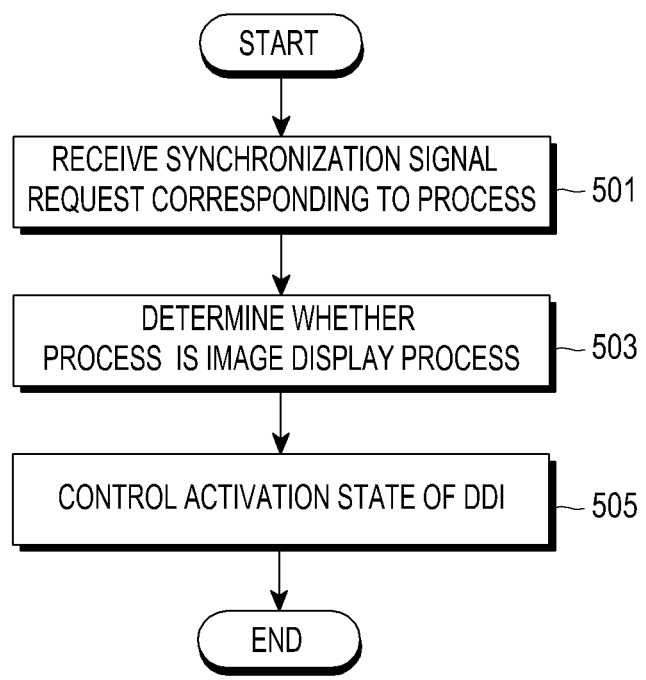
FIG. 5 illustrates a control method of an electronic device according to various embodiments of the present disclosure.

FIG. 5 illustrates a control method of an electronic device according to various embodiments of the present disclosure.

Referring to FIG. 5, according to various embodiments, in operation 501, a DDI (for example, the DDI 480 shown in FIG. 4) may receive a synchronization signal request corresponding to a first process, initiated by a processor (for example, the processor 120 shown in FIG. 1), from the processor 120.

For example, the first process and processes other than the first process may be run by at least one instruction or at least one program stored in a memory (for example, the memory 130), and may include at least one function associated with the generation of data (for example, an image data), the alteration of the data, or the output of the data within the instruction or the run program, or an operation in which the at least one function is integrated.

According to various embodiments, in operation 503, the DDI 480 may determine whether the first process is for displaying an image.

According to various embodiments, in operation 505, the DDI 480 may control the activation state of the DDI 480 based on a result of determining whether the first process is an image display process. For example, the DDI 480 may control the activation state of a gate driver in the DDI 480. In another example, the DDI 480 may switch the gate driver to an active state or maintain the gate driver in an active state, or may switch the gate driver to an inactive state or maintain the gate driver in an inactive state.

According to an embodiment, after operation 505, the DDI 480 may generate a synchronization signal based on the determination result, and may transmit the synchronization signal generated based on the determination result to the processor 120.

For example, when it is determined that the first process is a process different from the image display process, the DDI 480 may maintain the gate driver in an inactive state based on the determination result. For example, with the gate driver in an inactive state, the DDI 480 may generate a software-based clock synchronization signal using a clock in the DDI 480 based on a predetermined period. The DDI 480 may transmit the clock synchronization signal to the processor 120.

According to another embodiment, when it is determined that the first process is the image display process, after operation 505, the DDI 480 may obtain the refresh cycle (operating cycle) of a display (for example, the display 160) in the DDI 480 by using the gate driver, may generate a display synchronization signal based on the obtained refresh cycle, and may transmit the display synchronization signal to the processor 120.

Figure 6:
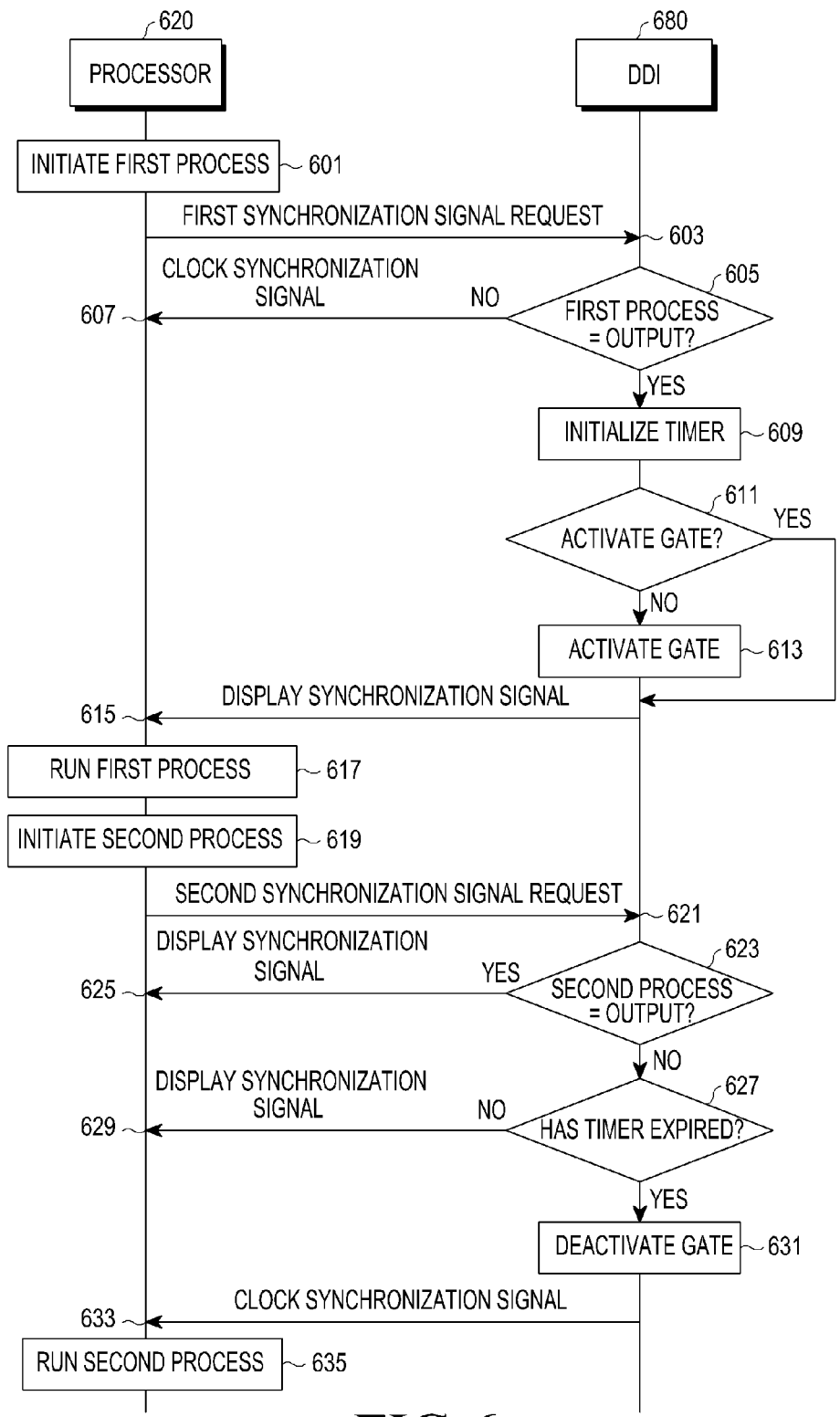
FIG. 6 illustrates a power control method according to various embodiments of the present disclosure.

FIG. 6 illustrates a power control method according to various embodiments of the present disclosure.

Referring to FIG. 6, according to various embodiments, operations 601 to 633 illustrated in FIG. 6 may be performed by an electronic device (for example, the electronic device 101) using a processor or at least one processor (for example, the processor 120 or 420 shown in FIGS. 1 and 4) and/or a DDI (for example, the DDI 180 or 480 shown in FIGS. 1 and 4)).

For example, a first process and a second process of FIG. 6 may be an example of the process described with reference to FIG. 5. In another example, the first process or the second process may be an image display process or a process different from the image display process. In still another example, the first process may be a process that is initiated prior to the second process and is run prior to the second process.

Referring to FIG. 6, according to various embodiments, in operation 601, the processor 620 (e.g., at least one processor) may initiate the first process.

In operation 603, the processor 620 may transmit a first synchronization signal request corresponding to the first process to the DDI 680.

According to various embodiments, in operation 605, the DDI 680 may determine whether the first process is an image output process.

According to various embodiments, when it is determined that the first process is a process different from the image output process, the DDI 680 may generate and transmit a clock synchronization signal to the processor 620 in operation 607.

According to various embodiments, when it is determined that the first process is the image output process, the DDI 680 may initialize a timer in operation 609.

According to various embodiments, in operation 611, the DDI 680 may determine whether a gate driver is in an inactive state.

According to various embodiments, when it is determined that the gate driver is in an inactive state, the DDI 680 may switch the gate driver to an active state in operation 613.

According to various embodiments, when it is determined that the gate driver is in an active state or after operation 613, the DDI 680 may generate a display synchronization signal based on the refresh cycle of a display (for example, the display 160 shown in FIG. 1) and may transmit the generated display synchronization signal to the processor 620 in operation 615.

According to various embodiments, in operation 617, the processor 620 may run the first process based on the clock synchronization signal or the display synchronization signal.

According to various embodiments, after operation 617, the processor 620 may initiate the second process in operation 619.

According to various embodiments, in operation 621, the processor 620 may transmit a second synchronization signal request for running the second process to the DDI 680.

According to various embodiments, in operation 623, the DDI 680 may determine whether the second process is for outputting an image.

According to various embodiments, when it is determined that the second process is for outputting an image, the DDI 680 may transmit a display synchronization signal to the processor 620 using the gate driver in an active state in operation 625. For example, when it is determined that the timer has expired, the DDI 680 may determine whether the gate driver is activated, and when it is determined that the gate driver is in an inactive state, the DDI 680 may activate the gate driver. According to a determination result or a result of activating the gate driver, the DDI 680 may transmit the display synchronization signal to the processor 620 using the gate driver in an active state.

According to various embodiments, when it is determined that the second process is a process different from that for outputting an image, the DDI 680 may determine whether the timer has expired in operation 627, and when it is determined that the timer has not expired in operation 627, the DDI 680 may generate and transmit a display synchronization signal to the processor 620.

According to various embodiments, when it is determined that the timer has expired, the DDI 680 may switch the activation state of the gate driver to an inactive state in operation 631.

According to various embodiments, in operation 633, the DDI 680 may transmit a clock synchronization signal to the processor 620.

According to various embodiments, in operation 635, the processor 620 may run the second process based on the clock synchronization signal or the display synchronization signal.

Figure 7:
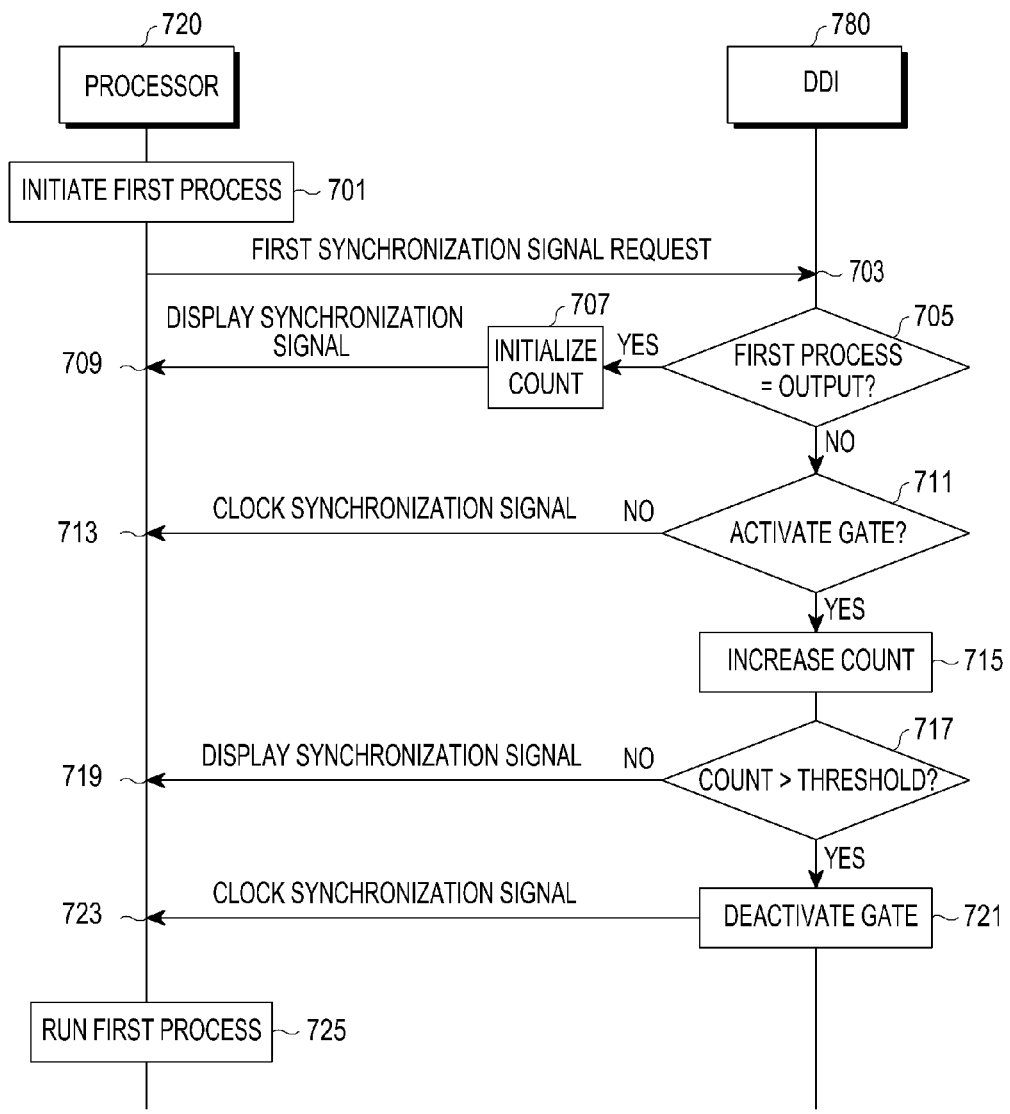
FIG. 7 illustrates a power control method according to various embodiments of the present disclosure.

FIG. 7 illustrates a power control method according to various embodiments of the present disclosure.

Referring to FIG. 7, according to various embodiments, in operation 701, a processor 720 (e.g., at least one processor) may initiate a first process.

According to various embodiments, in operation 703, the processor 720 may transmit a first synchronization signal request to a DDI 780.

According to various embodiments, in operation 705, the DDI 780 may determine whether the first process is an image output process.

According to various embodiments, when it is determined that the first process is an image output process, the DDI 780 may initialize a count in operation 707, and may generate and transmit a display synchronization signal to the processor 720 in operation 709.

According to various embodiments, when it is determined that the first process is a process different from the image output process, the DDI 780 may determine whether a gate driver is in an active state in operation 711.

According to various embodiments, when the gate driver is in an inactive state, the DDI 780 may generate and transmit a clock synchronization signal to the processor 720 in operation 713.

According to various embodiments, when the gate driver is in an active state, the DDI 780 may increase the count in operation 715. For example, the DDI 780 may add '1' to the current count.

According to various embodiments, in operation 717, the DDI 780 may determine whether the current count exceeds a threshold (for example, 50).

According to various embodiments, when the current count does not exceed the threshold, the DDI 780 may generate and transmit a display synchronization signal to the processor 720 using the gate driver in an active state in operation 719.

According to various embodiments, when the current count exceeds 50, the DDI 780 may switch the activation state of the gate driver to an inactive state in operation 721, and may generate and transmit a clock synchronization signal to the processor 720 using a clock in operation 723.

According to various embodiments, in operation 725, the processor 720 may run the first process based on the display synchronization signal or the clock synchronization signal.

Figure 8:
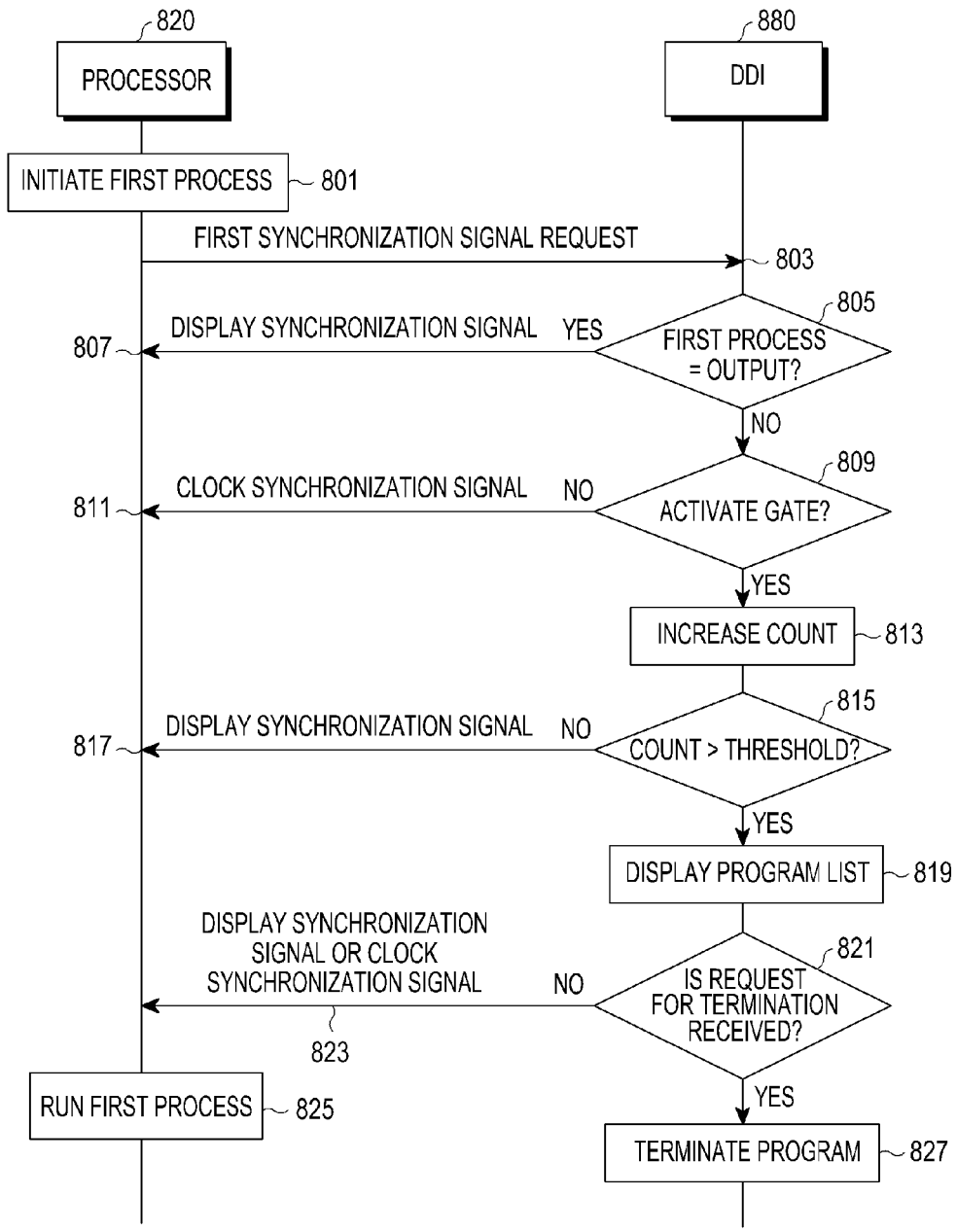
FIG. 8 illustrates a power control method according to various embodiments of the present disclosure.

FIG. 8 illustrates a power control method according to various embodiments of the present disclosure.

Referring to FIG. 8, according to various embodiments, a processor 820 (e.g., at least one processor) may initiate a first process in operation 801, and may transmit a first synchronization signal request to a DDI 880 in operation 803.

According to various embodiments, in operation 805, the DDI 880 may determine whether the first process is an image output process.

According to various embodiments, when it is determined that the first process is the image output process, the DDI 880 may generate a display synchronization signal (for example, a display synchronization signal generated based on the refresh cycle of the display 160 shown in FIG. 1) and may transmit the display synchronization signal to the processor 820 using a gate driver in an active state in operation 807.

According to various embodiments, when it is determined that the first process is a process different from the image output process, the DDI 880 may determine whether the gate driver is in an active state in operation 809.

According to various embodiments, when the gate driver is in an inactive state, the DDI 880 may generate and transmit a clock synchronization signal to the processor 820 in operation 811.

According to various embodiments, when the gate driver is in an active state, the DDI 880 may increase a count in operation 813. For example, the DDI 880 may add '1' to the current count.

According to various embodiments, in operation 815, the DDI 880 may determine whether the current count exceeds a threshold (for example, 50).

According to various embodiments, when the current count does not exceed the threshold, the DDI 880 may generate and transmit a display synchronization signal to the processor 820 using the gate driver in an active state in operation 817.

According to various embodiments, when the current count exceeds the threshold (for example, 50), the DDI 880 may display a list of at least one program associated with the first process on a display (for example, the display 160) in operation 819.

According to various embodiments, in operation 821, the DDI 880 may determine through the program list whether a request to terminate each of the at least one program has been received.

According to various embodiments, when a request to maintain one or more programs has been received, the DDI 880 may generate and transmit a clock synchronization signal or a display synchronization signal to the processor 820 in operation 823.

According to various embodiments, in operation 825, the processor 820 may run the first process using the display synchronization signal or the clock synchronization signal.

According to various embodiments, when a request to terminate one or more programs is received, the DDI 880 may terminate one or more selected programs in operation 827.

Figure 9:
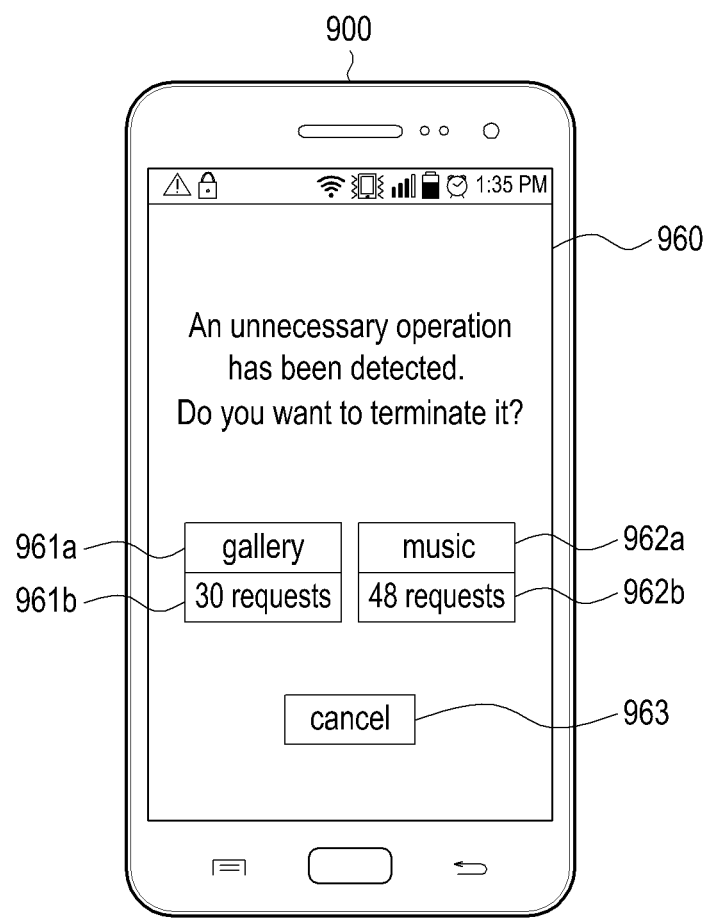
FIG. 9 illustrates a program list display screen according to various embodiments of the present disclosure.

FIG. 9 illustrates a program list display screen according to various embodiments of the present disclosure.

Referring to FIG. 9, according to various embodiments, a display 960 of an electronic device 900 may display at least one program list 961*a* and 962*a* associated with a process corresponding to a currently requested synchronization signal, along with a phrase "An unnecessary operation has been detected. Do you want to terminate it?" according to control by a DDI (for example, the DDI 880) or a processor (for example, the processor 820).

The display 960 may display the at least one program list 961*a* and 962*a* associated with the process corresponding to the currently requested synchronization signal, simultaneously with the display of the number of synchronization signal requests 961*b* and 962*b* made corresponding to at least one process run by each program (for example, a gallery application or a music application).

The display 960 may receive a selection of each program list 961*a* and 962*a* or a selection of all program lists, and the processor 820 may terminate a selected program in response to the receipt of the selection of each program list 961*a* and 962*a* or the selection of all program lists.

According to an embodiment, the display 960 of the electronic device 900 may display a "cancel" button 963. When the DDI 880 receives information relating to the selection of the "cancel" button 963, the DDI 880 may transmit a display synchronization signal to the processor 820 in response to the currently requested synchronization signal, without terminating the programs.

A control method of an electronic device according to various embodiment of the present disclosure may include: receiving a synchronization signal request corresponding to a first process initiated by at least one processor from the at least one processor; determining whether the first process is for displaying an image in response to the synchronization signal request; and controlling an activation state of a DDI for displaying the image based on a determination result.

According to various embodiments, the control method may further include: initiating a timer based on the determination result; and controlling the activation state of the DDI based on the determination result and on a state of the timer.

A nonvolatile computer-readable recording medium according to various embodiment of the present disclosure may record a program to be implemented on a computer, wherein the program may include an executable instruction for a DDI to perform, when run by the display driver integrated circuit: an operation of receiving a synchronization signal request corresponding to a first process initiated by a processor from the processor; an operation of determining whether the first process is for displaying an image in response to the synchronization signal request; and an operation of controlling an activation state of the DDI for displaying the image based on a determination result.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   at least one processor;
   a memory electrically connected to the at least one processor; and
   a display driver integrated circuit electrically connected to the at least one processor,
   wherein the display driver integrated circuit is configured to:
      receive, from the at least one processor, a synchronization signal request corresponding to a first process initiated by the at least one processor,
      in response to receiving the synchronization signal request, determine whether the first process is for displaying an image, and
      control an activation state of the display driver integrated circuit for displaying the image based on a determination result of whether the first process is for displaying the image, and
   wherein the memory is configured to store instructions for the at least one processor to initiate and run the first process.

2. The electronic device of claim 1, wherein the display driver integrated circuit is further configured to:
   initiate a timer based on the determination result, and
   control the activation state of the display driver integrated circuit based on the determination result and a state of the timer.

3. The electronic device of claim 2, wherein the display driver integrated circuit is further configured to control the activation state of the display driver integrated circuit based on the determination result and whether the timer expires.

4. The electronic device of claim 2, wherein the display driver integrated circuit is further configured to initialize the timer when the at least one processor determines that the first process is for displaying the image.

5. The electronic device of claim 2, wherein, when the display driver integrated circuit determines that the first process comprises a process different from a process for displaying the image, the display driver integrated circuit is further configured to:
   determine whether the timer expires, and
   control the activation state of the display driver integrated circuit based on whether the timer expires.

6. The electronic device of claim 1, wherein the display driver integrated circuit is further configured to:
   initiate a count based on the determination result, and
   control the activation state of the display driver integrated circuit based on the determination result and a state of the initiated count.

7. The electronic device of claim 6, wherein the display driver integrated circuit is further configured to control the activation state of the display driver integrated circuit based on the determination result and whether a value of the initiated count reaches a threshold.

8. The electronic device of claim 6, wherein the display driver integrated circuit is further configured to initialize the initiated count when the at least one processor determines that that the first process is for displaying the image.

9. The electronic device of claim 6, wherein, when the display driver integrated circuit determines that the first process comprises a process different from a process for displaying the image, the display driver integrated circuit is further configured to:
   determine whether the count reaches a threshold, and
   control the activation state of the display driver integrated circuit based on whether the count reaches the threshold.

10. The electronic device of claim 1, wherein the display driver integrated circuit is further configured to:
    display at least one program list associated with the first process based on the determination result,
    receive, through the at least one program list, a request for termination of one or more programs among at least one program of the at least one program list, and
    in response to receiving the request for termination of the one or more programs, control the activation state of the display driver integrated circuit.

11. The electronic device of claim 10, wherein the display driver integrated circuit is further configured to display synchronization signal request numbers corresponding to each of the at least one program, along with the at least one program list.

12. The electronic device of claim 1,
    wherein the display driver integrated circuit comprises a gate driver that is electrically connected to the display, and
    wherein the display driver integrated circuit is configured to control an activation state of the gate driver based on the determination result.

13. The electronic device of claim 12, wherein the display driver integrated circuit is further configured to maintain the gate driver in an active state when the display driver integrated circuit determines that the first process is for displaying the image.

14. The electronic device of claim 13, wherein the display driver integrated circuit is further configured to:
    acquire operating cycle information on the display using the gate driver,
    generate a display synchronization signal based on the operating cycle information on the display, and
    transmit the display synchronization signal to the at least one processor.

15. The electronic device of claim 12, wherein, when the display driver integrated circuit determines that the first process comprises a process different from a process for displaying the image, the display driver integrated circuit is further configured to maintain the gate driver in an inactive state.

16. The electronic device of claim 15,
    wherein the display driver integrated circuit further comprises a clock, and
    wherein the display driver integrated circuit is further configured to:
    generate a clock synchronization signal having a preset period using the clock, and
    transmit the clock synchronization signal to the at least one processor.

17. A method for controlling an electronic device, the method comprising:
    receiving, by a display driver integrated circuit of the electronic device from at least one processor of the electronic device, a synchronization signal request corresponding to a first process initiated by the at least one processor;
    in response to receiving the synchronization signal request, determining, by the display driver integrated circuit, whether the first process is for displaying an image; and
    controlling an activation state of the display driver integrated circuit for displaying the image based on a determination result of whether the first process is for displaying the image.

18. The method of claim 17, further comprising:
    initiating a timer based on the determination result; and
    controlling the activation state of the display driver integrated circuit based on the determination result and a state of the timer.

19. A non-transitory non-volatile computer-readable recording medium that records a program to be implemented on a computer, the program comprising one or more executable instructions for a display driver integrated circuit to perform:
    an operation of receiving, from at least one processor, a synchronization signal request corresponding to a first process initiated by the at least one processor;
    an operation of, in response to receiving the synchronization signal request, determining whether the first process is for displaying an image; and
    an operation of controlling an activation state of the display driver integrated circuit for displaying the image based on a determination result of whether the first process is for displaying the image.

20. An electronic device comprising:
    a display;
    at least one processor;
    a memory electrically connected to the at least one processor; and
    a display driver integrated circuit electrically connected to the at least one processor,
    wherein the memory is configured to store instructions that causes the display driver integrated circuit to perform:
    an operation of receiving a synchronization signal request corresponding to a first process,
    an operation of, in response to receiving the synchronization signal request, determining whether the first process is for displaying an image, and
    an operation of controlling an activation slate of a display driver integrated circuit for displaying the image based on a determination result of whether the first process is for displaying the image.

21. The electronic device of claim 20, wherein the instructions further cause the display driver integrated circuit to perform an operation of controlling power applied to the display based on a result of distinguishing a process for generating the image from a process for outputting the image.

* * * * *